United States Patent [19]
Ledgerwood

[11] Patent Number: 5,649,713
[45] Date of Patent: Jul. 22, 1997

[54] GASKET FOR HUB AND SPIGOT PIPE JOINTS

[75] Inventor: Harry J. Ledgerwood, Marshfield, Mo.

[73] Assignee: Tyler Pipe Company, a div. of Ransom Industries, Inc., Birmingham, Ala.

[21] Appl. No.: 528,526

[22] Filed: Sep. 14, 1995

Related U.S. Application Data

[63] Continuation of Ser. No. 199,934, Feb. 22, 1994, abandoned.

[51] Int. Cl.⁶ ........................................ F16J 15/10
[52] U.S. Cl. ............... 277/209; 277/211; 277/207 A
[58] Field of Search ................ 277/207 A, 207 R, 277/208, 209, 211

[56] References Cited

U.S. PATENT DOCUMENTS

| | | | |
|---|---|---|---|
| 1,817,774 | 8/1931 | Sipe | 277/207 A |
| 2,209,235 | 7/1940 | Nathan | 277/207 A |
| 2,314,386 | 3/1943 | Brend | 277/207 A |
| 2,615,741 | 10/1952 | Nathan | 277/207 A |
| 3,046,028 | 7/1962 | Nathan | 277/207 A |
| 3,249,685 | 5/1966 | Heflin, Jr. | 277/207 A |
| 3,386,745 | 6/1968 | Hein | 277/207 A |
| 3,573,871 | 4/1971 | Warner | 277/168 |
| 4,223,895 | 9/1980 | Roberts, Jr. et al. | 277/207 A |
| 4,538,839 | 9/1985 | Ledgerwood | 285/236 |
| 4,565,381 | 1/1986 | Joelson | 277/207 A |
| 4,915,422 | 4/1990 | Chacon et al. | 277/207 A |
| 5,288,087 | 2/1994 | Bertoldo | 277/207 A |

*Primary Examiner*—William A. Cuchlinski, Jr.
*Assistant Examiner*—John L. Beres
*Attorney, Agent, or Firm*—Michael A. O'Neil; Russell N. Rippamonti

[57] ABSTRACT

An elastomeric gasket comprises an annular body having an outer surface with a flanged edge, a sealing bead, and a semi-circular locking bead to facilitate insertion, and an inner surface comprising multiple, flexible angularly inwardly-extending lips that are self-sealing under pressure.

1 Claim, 4 Drawing Sheets

GASKET FOR HUB AND SPIGOT PIPE JOINTS

This application is a Rule 1.62 file wrapper continuation of application Ser. No. 08/199,934 filed on Feb. 22, 1994, now abandoned.

TECHNICAL FIELD

The present invention relates generally to gaskets for hub and spigot pipe joints, and more particularly to a gasket for hub and spigot pipe joints including an annular body having a semi-circular locking bead on the outer surface to facilitate insertion of the gasket into the spigot of the joint, and multiple flexible angularly inwardly-extending lips on the inner surface which are self-sealing under pressure.

THE BACKGROUND AND SUMMARY OF THE INVENTION

FIG. 1 illustrates a prior art gasket G adapted for use in hub and spigot pipe joints. The gasket G comprises an annular body B having inner and outer surfaces, and having a flange F at one end thereof. The outer surface of the annular body B includes a locking bead L comprising a flat outer surface and angularly extending side surfaces. The interior of the annular body B of the gasket G comprises two sealing lips S1 and S2. The sealing lips of the prior art gasket G are relatively thick and relatively large and are, therefore, relatively inflexible.

FIG. 2 illustrates the gasket for hub and spigot pipe joints of the present invention. The gasket of the present invention is characterized by a semi-circular locking bead formed on the outer surface of the annular body comprising the gasket. The gasket of the present invention is further characterized by multiple angularly inwardly-extending sealing lips which are relatively small and relatively thin compared with the sealing lips of the prior art gasket and are, therefore, relatively flexible.

The multiple sealing lips on the inside of the gasket, combined with the locking bead on the outside of the gasket, are the important features of the gasket. The multiple sealing lips on the inside of the gasket allow the joining pressure at the pipe to be greatly reduced without giving up any of the sealing qualities of the prior art gasket. The semi-circular locking bead on the outside of the gasket prevents the gasket from being forced from the hub of the pipe assembly when pressure is applied to the pipe. These features set the present invention aside from other gasket designs.

BRIEF DESCRIPTION OF THE DRAWINGS

For a more complete understanding of the present invention and the advantage thereof, reference may be made to the following description taken in conjunction with the accompanying drawings in which.

DETAILED DESCRIPTION OF THE INVENTION

Figure 2:
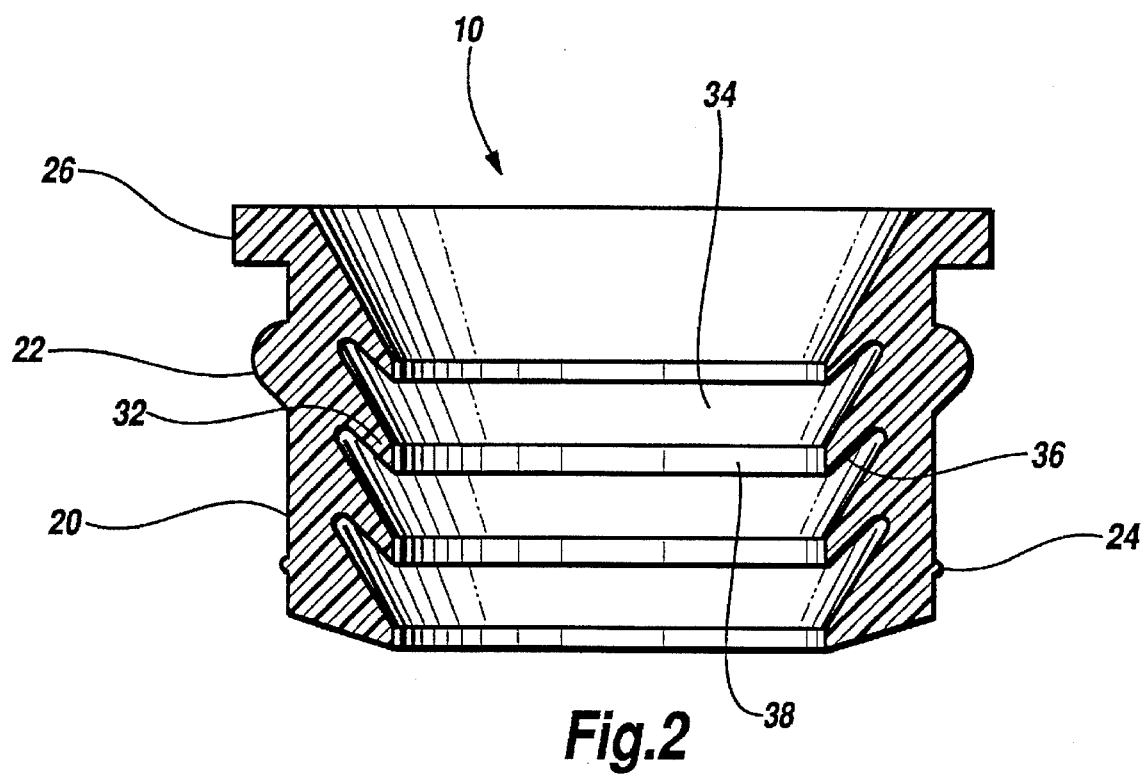
FIG. 2 is a cross-sectional view of the gasket of the present invention.
Figure 4:
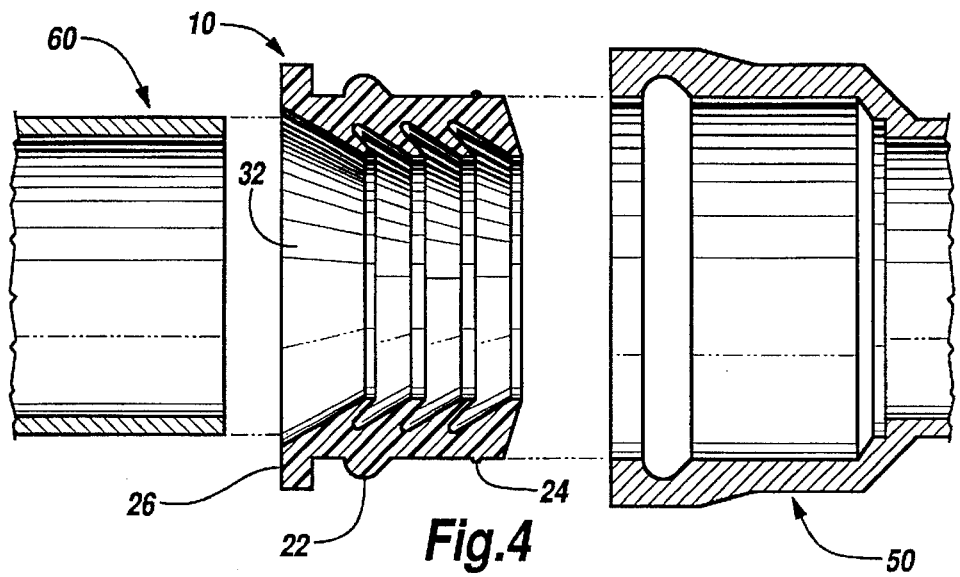
FIGS. 4–6 are cross-sectional views illustrating steps involved in forming a hub and spigot joint using the gasket of the present invention.
Figure 5:
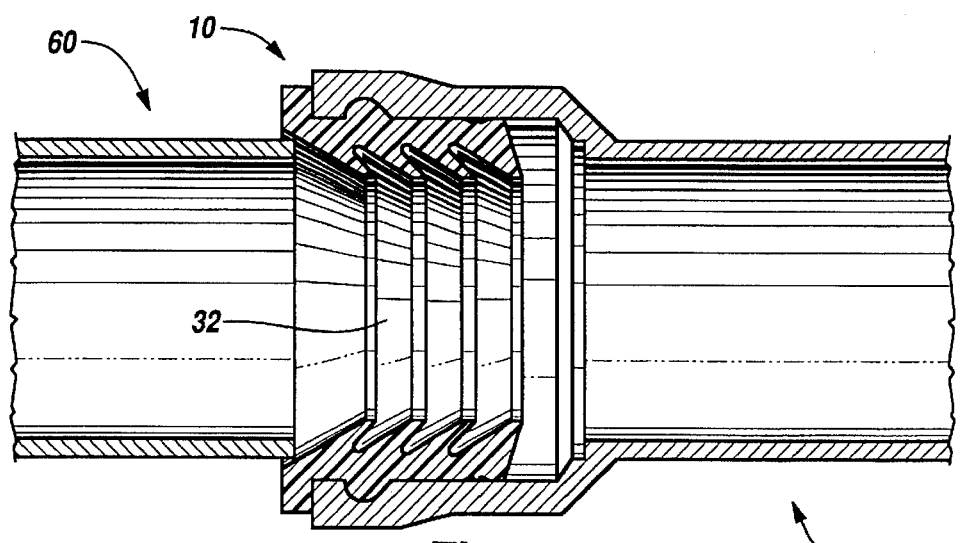
Figure 6:
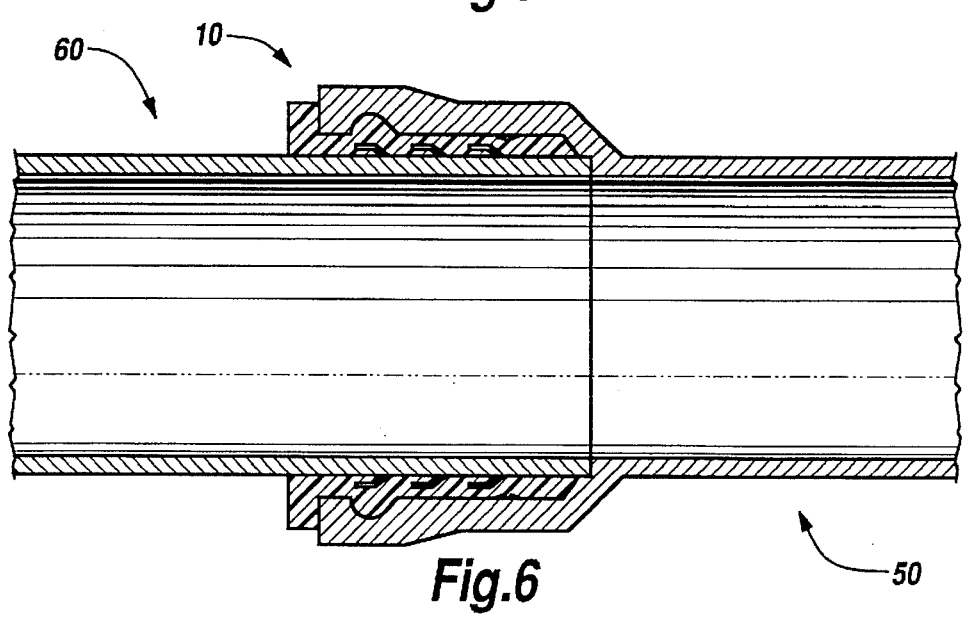

Referring now to FIG. 2, the present invention comprises a gasket 10 having an outer surface 20 with at least one semi-circular locking bead 22 and a sealing bead 24. The flanged edge 26 of the gasket 10 limits the extent to which the gasket 10 may be inserted into the pipe hub 50 (FIGS. 4–6). The semi-circular locking bead 22 has smooth surfaces so that the gasket 10 may easily be placed into a pipe hub. The sealing bead 24 is substantially smaller than the semi-circular locking bead 22 so that the piping does not need to be grooved in order to accommodate the sealing bead 24. Once the gasket 10 is inserted into the hub, the sealing bead 24 serves to hold the lower portion of the gasket 10 in place, thus strengthening the seal between the inner and outer surfaces of the gasket 10. The inner surface 30 of the gasket 10 consists of multiple angularly inwardly-extending sealing lips 32. These lips 32 have top surfaces 34 and bottom surfaces 36 that are substantially longer than the side surface 38, thus allowing flexibility in the lips 32.

Figure 3:
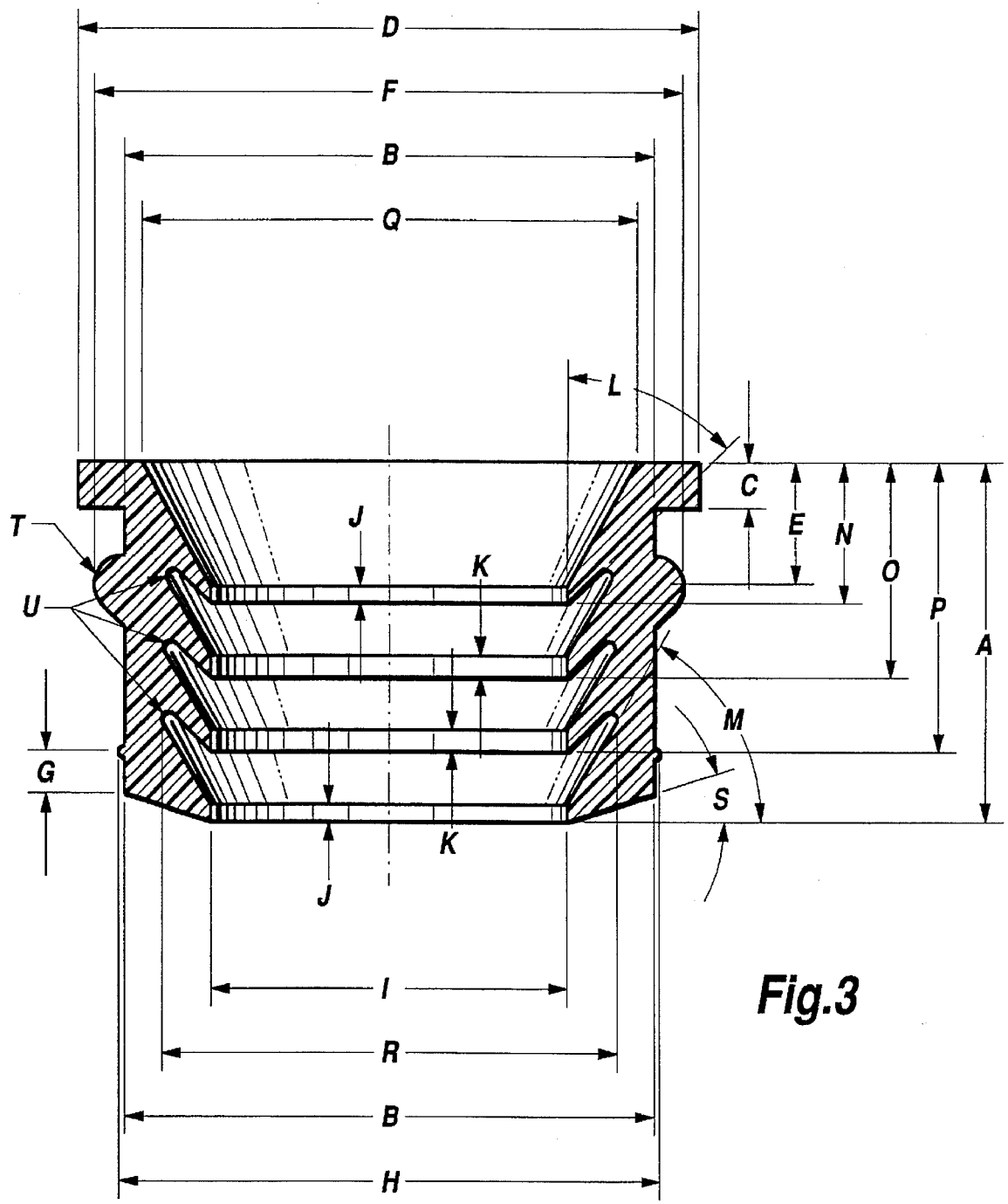
FIG. 3 is an enlargement of FIG. 2 illustrating the dimensions of the present gasket.

FIG. 3 illustrates the dimensions of the present invention. The preferred embodiment of the gasket has a height A and a diameter B. The flange is located on the topmost outer surface of the gasket and has a height C. The gasket has a diameter D at the location of the flange. The semi-circular locking bead is located on the outer surface of the gasket a predetermined distance from the flange. The center of the semi-circular locking bead is located a distance E from the top of the gasket. The semicircular locking bead has a radius T. The gasket has a diameter F at the center most point of the semi-circular locking bead. The sealing bead is located on the outer surface of the gasket a predetermined distance from the semi-circular locking bead. The centerpoint of the sealing bead is located a distance G from the bottom of the gasket and the gasket has a diameter H at the centerpoint of the sealing bead.

The inner surface of the gasket is comprised of four flexible sealing lips. The side surfaces of the lips each have a diameter I. The top and bottom lips have side surfaces with a height J and the middle lips have side surfaces with a height K. The bottom surfaces of the lips and the top surfaces of the next adjacent lips form a radius U. The surfaces parallel to the height of the gasket and the bottom surfaces of the top three lips each form an angle L. The top surface of the bottom lip and the surface parallel to the diameter of the gasket forms an angle M. The lowermost portion of the top lip is a distance N from the top of the gasket. The lowermost portion of the second lip is a distance O from the top of the gasket. The lowermost portion of the third lip is a distance P from the top of the gasket. The lowermost portion of the bottom lip is a distance A from the top of the gasket. The top surface of the top lip has a diameter Q at the top of the gasket. The top surfaces of the other lips have a diameter R at the uppermost portion of top surfaces. The bottom surface of the lowermost lip forms an angle S with a plane horizontal to the top of the gasket.

EXAMPLE
A commercially successful embodiment of the gasket shown in FIG. 3 has the following dimensions:

| | | | |
|---|---|---|---|
| Height A = | 2.000 in. | Height K = | 0.125 in. |
| Diameter B = | 3.000 in. | Angle L = | 45° |
| Height C = | 0.250 in. | Angle M = | 60° |

-continued

EXAMPLE
A commercially successful embodiment of the gasket shown in FIG. 3 has the following dimensions:

| | | | |
|---|---|---|---|
| Diameter D = | 3.500 in. | Distance N = | 0.750 in. |
| Distance E = | 0.625 in. | Distance O = | 1.167 in. |
| Diameter F = | 3.187 in. | Distance P = | 1.584 in. |
| Distance G = | 0.375 in. | Diameter Q = | 2.812 in. |
| Diameter H = | 3.062 in. | Diameter R = | 2.625 in. |
| Diameter I = | 2.062 in. | Angle S = | 22° 30' |
| Height J = | 0.094 in. | Radius T = | 0.187 in. |
| | | Radius U = | 0.031 in. |

FIGS. 4–6 illustrate the manner in which the gasket 10 creates a seal between a pipe hub 50 and spigot 60. In FIG. 4, the pipe hub 50, gasket 10 and pipe spigot 60 are aligned. In FIG. 5, the gasket 10 is inserted into the hub 50. Lubricant (not shown) is optionally added to the inner surface 30 of the gasket 10 before the spigot 60 is adjoined to facilitate the assembly process. The spigot 60 is pulled or pushed through the inner surface 30 of the flexible lips 32 to create a seal between the inner surface 30 of the gasket annulus and the spigot 60. The semi-circular locking bead 22 firmly connects and seals the gasket 10 to the hub 50 of the pipe and the sealing bead 24 creates an additional sealing surface. Therefore, the pipe couplings are joined and a tight seal is created.

Figure 1:
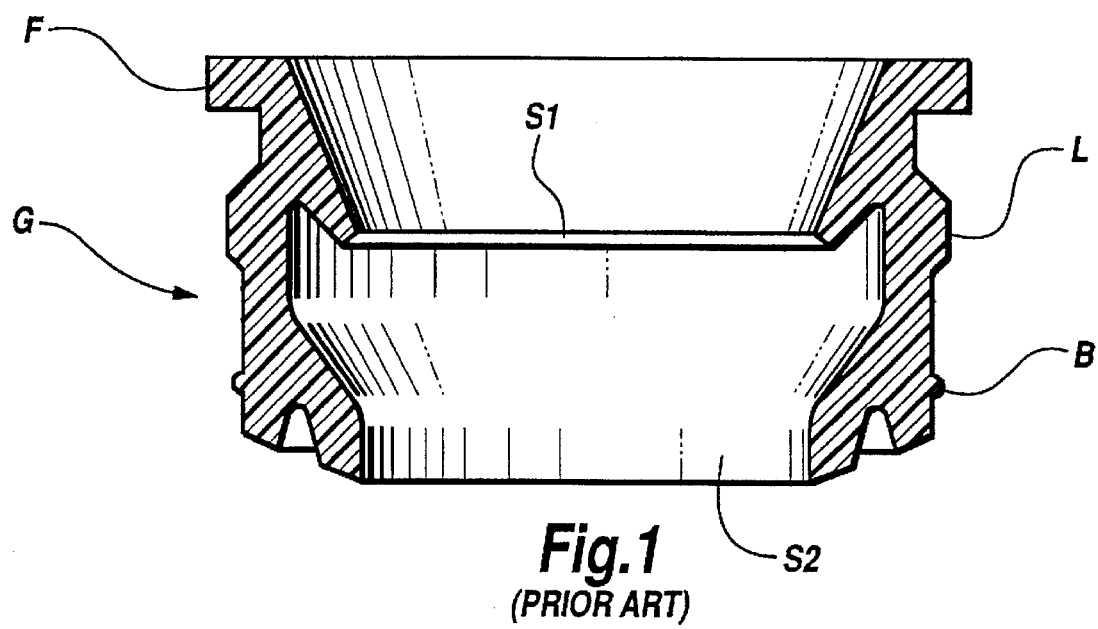
FIG. 1 is a cross-sectional view of a prior art gasket.

The flexible multiple lips 32 allow the pipe couplings 50 and 60 to shift slightly and yet maintain a tight seal since the seal created by the multiple lips 32 covers a greater surface area than the prior art gasket 100 (FIG. 1). Therefore, even if the pipes shift, the lips 32 remain in contact with the spigot 60.

Figure 7:
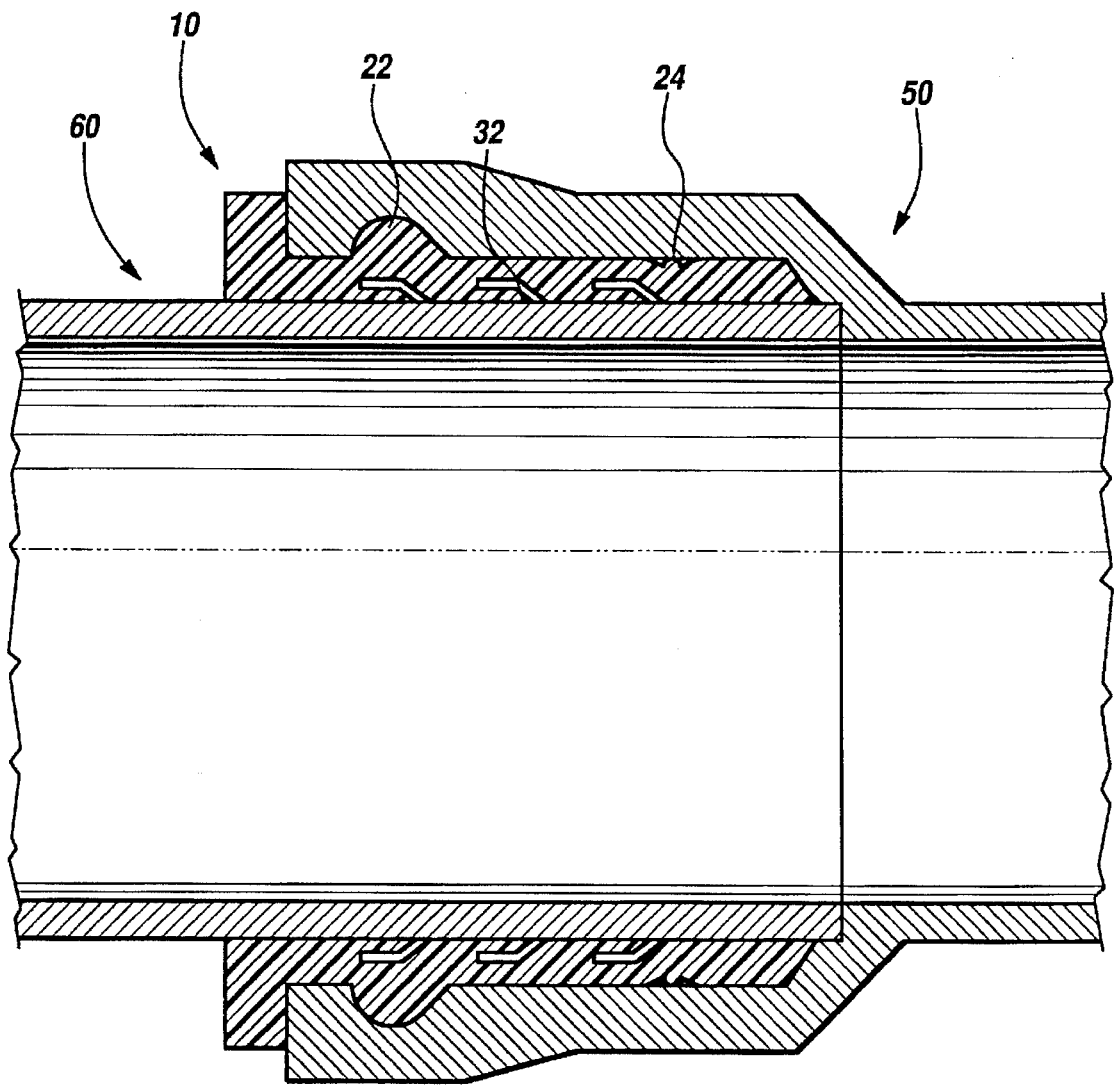
FIG. 7 is an enlargement of FIG. 6 illustrating the continuous sealing surface created by the multiple angularly inwardly-extending sealing lips of the gasket of the present invention.

FIG. 7 illustrates the continuous sealing surface created by the multiple angularly inwardly-extending sealing lips 32. As can be seen, the lips 32 are self-sealing as they are subjected to additional pressure. After the gasket 10 is placed into the hub 50, the lips 32 are folded over due to their flexibility. As the spigot 60 is inserted and as any additional pressure is applied to the gasket 10, the lips 32 will further compress, thereby creating an even tighter seal.

Although preferred embodiments of the present invention have been illustrated in the foregoing Detailed Description, it will be appreciated by those skilled in the art that various modifications and rearrangements of the component parts and elements of the present invention are possible within the scope of the present invention.

I claim:

1. An elastomeric gasket for joining and sealing the components of a bell and spigot pipe joint, said bell having an external first face, an internal tubular section with an internal circumferential locking groove a pre-determined distance from the first face, an internal circumferential second face oriented angularly inward and located a pre-determined distance from the locking groove, and an internal circumferential third face a pre-determined distance from the second face, said spigot having an external first face perpendicular to a central axis of the pipe for engagement with the third face of the bell and a substantially cylindrical outer surface, said elastomeric gasket comprising:
   an annular body with a central axis including outer and inner surfaces and first and second ends;
   a radially extending flange located at the first end of the annular body for engagement with the first face of the bell;
   a semi-circular locking bead located on the outer surface of the annular body a predetermined distance from the flange for engagement with the locking groove of the bell;
   a sealing bead located on the outer surface of the annular body a predetermined distance from the semi-circular locking bead and having a substantially smaller diameter than that of the semi-circular locking bead;
   said spigot being inserted inside the annular body such that the first face of the spigot seats in the third face of the bell; and
   said annular body being inserted inside of the bell such that the locking bead of the annular body seats in the locking groove of the bell, the flange of the annular body seats against the external first face of the bell and said sealing bead seals against the internal tubular section of the bell;

wherein the improvement comprises:
   a first face, located at the second end of the annular body, disposed in an unflexed position angularly outward at an angle of about 22 and ½ degrees from a plane perpendicular to the central axis of the annular body;
   three semi-flexible lips located on the inner surface of the annular body, said lips each having a top surface, a bottom surface and a side surface, said lips oriented angularly inward from the first end of the gasket, the side surface being substantially shorter than the top and bottom surfaces,
   the bottom surfaces of the lips disposed in an unflexed position at an angle of about 45 degrees from a plane perpendicular to the central axis,
   the top surface of the lips nearest to the first end of the annular body being disposed in an unflexed position at an angle of about 60 degrees from a plane perpendicular to the central axis, and
   the bottom surface of the lip nearest to the second end of the annular body being the external first face of the annular body;
   said annular body being compressed by insertion of the spigot such that the annular body seats in the internal tubular section of the bell, and said top surfaces of the lips seal against the cylindrical outer surface of the spigot.

\* \* \* \* \*